(12) United States Patent
Bardout

(10) Patent No.: US 9,535,160 B2
(45) Date of Patent: Jan. 3, 2017

(54) POSITIONING SYSTEM WITH FRAUD DETECTION MECHANISM FOR A CRITICAL APPLICATION

(75) Inventor: Yves Bardout, Toulouse (FR)

(73) Assignee: Thales, Courbevoie (FR)

(*) Notice: Subject to any disclaimer, the term of this patent is extended or adjusted under 35 U.S.C. 154(b) by 551 days.

(21) Appl. No.: 14/009,040

(22) PCT Filed: Mar. 28, 2012

(86) PCT No.: PCT/EP2012/055526
§ 371 (c)(1),
(2), (4) Date: Nov. 9, 2013

(87) PCT Pub. No.: WO2012/130889
PCT Pub. Date: Oct. 4, 2012

(65) Prior Publication Data
US 2014/0292571 A1 Oct. 2, 2014

(30) Foreign Application Priority Data
Mar. 31, 2011 (FR) .................................... 11 00961

(51) Int. Cl.
*G01S 19/13* (2010.01)
*G01S 19/21* (2010.01)
*G07B 15/06* (2011.01)

(52) U.S. Cl.
CPC .............. *G01S 19/13* (2013.01); *G01S 19/215* (2013.01); *G07B 15/063* (2013.01)

(58) Field of Classification Search
CPC ....... G01S 19/13; G01S 19/215; G07B 15/063

USPC ..................................................... 342/357.51
See application file for complete search history.

(56) References Cited

U.S. PATENT DOCUMENTS

| 8,391,490 B2 | 3/2013 | Damidaux |
| 2008/0316042 A1 | 12/2008 | Scales |
| 2010/0076878 A1 | 3/2010 | Burr et al. |
| 2010/0287038 A1 | 11/2010 | Copejans |

FOREIGN PATENT DOCUMENTS

WO 2009/037133 A1 3/2009

*Primary Examiner* — Harry Liu
(74) *Attorney, Agent, or Firm* — Baker & Hostetler LLP

(57) ABSTRACT

A positioning system comprises an onboard GNSS satellite receiver in a mobile element belonging to a user which estimates the position of said mobile element at various instants, a first processing module determining a consistency indicator by combining the estimated positions and data provided by secondary information sources, using a dynamic model of movement of the mobile elements to be positioned. The indicator is determined by comparing a speed, acceleration, gyration triplet derived from direction and velocity measurements taken by the mobile element, to a dynamic model of movement of an object, vehicle, person or animal to be positioned. The system comprises a consolidation module containing means storing the positions estimated at various instants, a digital filter to obtain a filtered position from the stored positions of a user, the consistency indicator calculated from filtered positions; and detection means determining from the consistency indicator whether the estimated positions are falsified.

12 Claims, 2 Drawing Sheets

POSITIONING SYSTEM WITH FRAUD DETECTION MECHANISM FOR A CRITICAL APPLICATION

CROSS-REFERENCE TO RELATED APPLICATIONS

This application is a National Stage of International patent application PCT/EP2012/055526, filed on Mar. 28, 2012, which claims priority to foreign French patent application No. FR 1100961, filed on Mar. 31, 2011, the disclosures of which are incorporated by reference in their entirety.

FIELD OF THE INVENTION

The invention relates to a positioning system with a fraud detection mechanism for a critical application and applies notably to the fields of satellite navigation systems.

BACKGROUND

Mobile electronic units employing applications requiring information on their geographical positioning contain means for estimating their position as accurately as possible. To do this, satellite geolocation systems are commonly used, these systems being denoted by the acronym GNSS (or Global Navigation Satellite Systems). An example of a GNSS is the GPS (or Global Positioning System).

It is necessary that these position estimations be integral and accurate for critical positioning applications. A critical positioning application denotes an application in which estimations of position must have a high degree of reliability. For example, such is notably the case for pay-per-use systems for insurance, parking and road networks, as well as electronic law enforcement systems such as electronic tagging devices or equipment for the tailing of suspects by police. Furthermore, applications for tracking inventory such as containers or driver assistance applications are also considered to be critical positioning applications.

The units used in systems employing critical positioning applications are usually tamper-resistant and use secure communication means. These units are also called Onboard Units and are denoted by the acronym OBU.

However, the radio link between the unit and the satellites belonging to the GNSS is usually implemented using an unprotected signal and is accessible to all. It is consequently possible for a user with malicious intent to disturb the normal operation of the unit so that the latter acquires falsified position estimations. These falsified estimations are usually transmitted by radio to processing servers, the operation of which is then also falsified. This type of fraud is possible without the pirate user even modifying the OBU. To do this, a low-cost device may be used, for example a device capable of receiving GNSS signals and retransmitting them after having modified them. The retransmitted and modified signal replaces the real signal originating from the satellites of the GNSS and the unit estimates an erroneous position.

In the case of a system implementing a payment application, the triggering of a payment is linked to pricing events triggered by the passage of the OBU through virtual gates or on entry/exit of a geographical zone. In this case, the device used for the fraud may be designed to neutralize pricing points while appearing compliant at control points, and to minimize these deviations from the real trajectories to avoid detection.

Existing methods make it possible to verify the operation of OBUs. This verification is performed statistically at fixed or mobile control points. Another way of proceeding is to verify a posteriori the consistency of the pricing events, for example by cross-checking the pricing events with the registration plates of the vehicles observed in the pricing zones. However, a fraud device may be designed to be silent during checks, since the position of check zones may be published by a centralized service, on the model of anti-speed camera radar devices.

Various methods for controlling the consistency of position estimations exist. This consistency may be verified by monitoring the absolute or relative power of the GNSS signals or by monitoring the power of the signal for each satellite.

The consistency of measurements may also be verified by using digital marking techniques notably allowing units to locate the emitters of a network. This technique is often denoted by the term "watermarking". An example of implementation of watermarking is disclosed in the patent application WO 2009/037133.

A large number of OBUs already deployed and in operation do not include such techniques for verifying the consistency of position estimations. To update these receivers, i.e. to include functionalities enabling them to verify the consistency of the measurements, it would be necessary to alter each receiver, which would incur substantial workforce costs.

Furthermore, these techniques do not make it possible to guarantee the integrity of the estimations. Sophisticated attacks may circumvent them, at least in part. For example, a trajectory may be modified with a slight deviation in gyration in relation to the real trajectory, to counter the consistency verification with data originating from an onboard inertial sensor in the vehicle, for example.

SUMMARY OF THE INVENTION

One aim of the invention is notably the palliation of the aforementioned drawbacks.

With this in mind, the subject of the invention is a positioning system comprising at least one onboard GNSS satellite receiver in a mobile element belonging to a user u, said receiver having the function of estimating the position Xu of said mobile element at various instants, a first processing module determining a consistency indicator coh(X) by combining the estimated positions Xu[t] and data provided by secondary information sources, a dynamic model of movement of the mobile elements to be positioned being used, said indicator being determined by comparing a speed, acceleration, gyration [v, a, g] triplet derived from direction and velocity measurements taken by the mobile element, to a dynamic model of movement of an object, vehicle, person or animal to be positioned. The system furthermore comprises a consolidation module containing means for storing the positions Xu[t] estimated at various instants t by user u, a digital filter making it possible to obtain a filtered position Xf[t] from the stored positions Xu[t] of a user, the consistency indicator coh(X) being calculated from the filtered positions Xf[t]. The system also contains detection means for determining from the consistency indicator coh(X) whether or not the estimated positions Xu(t) are falsified.

The digital filter integrates, for example, a set of estimated positions Xu[t] over all or part of a journey.

According to an aspect of the invention, the frequency of falsifications for a given user u is calculated and stored in a database.

The frequency of falsifications for chosen geographical zones may be determined and stored in a database.

The estimated positions may be used for the implementation of road tolls.

In an embodiment, the consolidation module performs a correlation between the estimated positions considered as suspicious and a pricing database comprising the geographical coordinates of the pricing zones.

The consistency indicator is for example determined using a dynamic model of movement of the mobile elements to be positioned, the indicator being determined by comparing a speed, acceleration, gyration [v,a,g] triplet derived from direction and velocity measurements taken by the mobile element, to a dynamic model of movement of an object, vehicle, person or animal to be positioned.

BRIEF DESCRIPTION OF THE DRAWINGS

Other features and advantages of the invention will appear with the aid of the following description, given by way of illustration and in no way limiting, with reference to the appended drawings in which.

DETAILED DESCRIPTION

Figure 1:
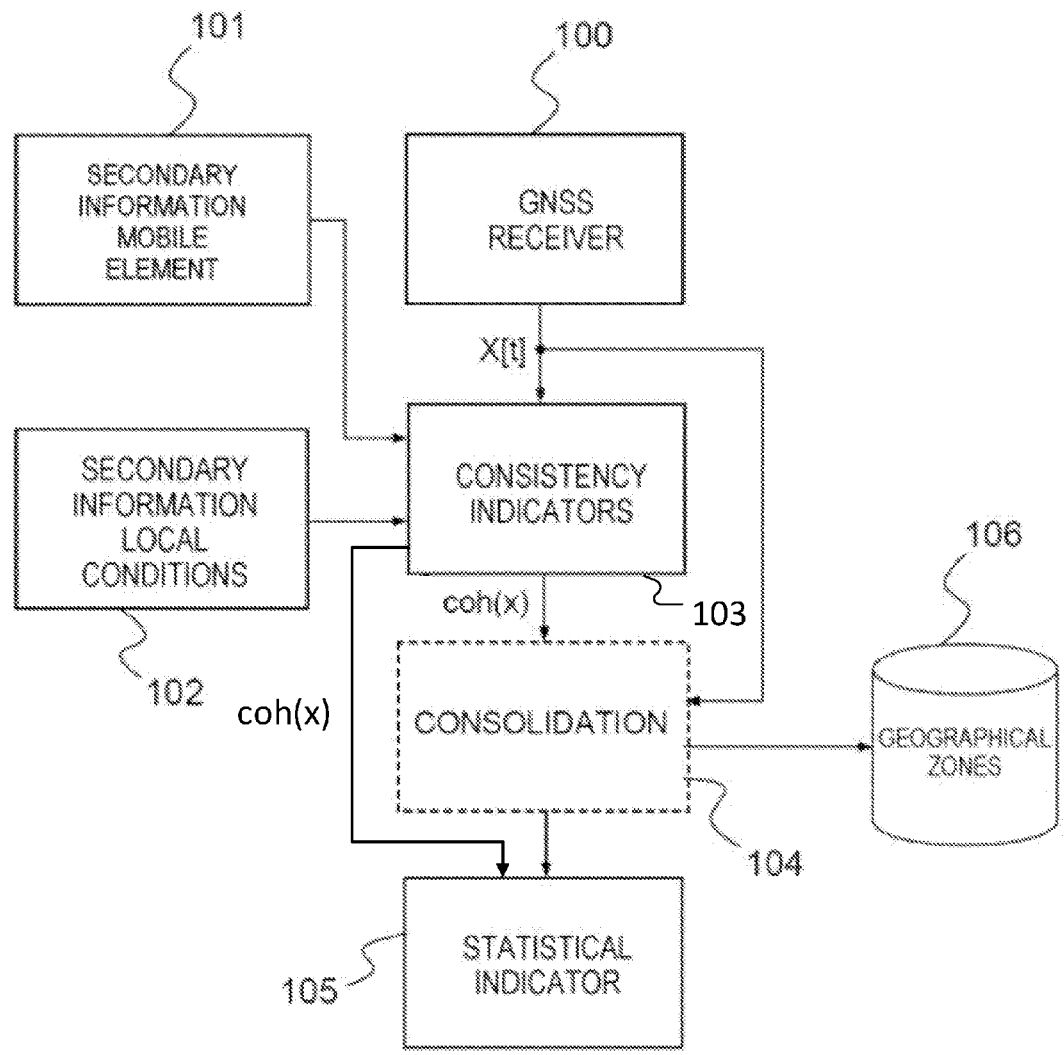
FIG. 1 is a simplified illustration of the positioning system according to the invention.

The system described using FIG. 1 comprises an OBU in which a GNSS receiver 100 has the function of estimating the position of a mobile element in which the unit is embedded. The mobile element corresponds for example to a person, an animal, a vehicle or any object. The system also comprises secondary information sources. These secondary items of information are of two types. The first type of secondary information relates to the localized mobile element 101. The second type of secondary information relates to the local conditions 102 in which the OBU is found. The system furthermore comprises means 103, 104, 105 for verifying the reliability of the estimated position.

All the components of the system may be implemented in the OBU. Alternatively, the GNSS receiver 100 and the source of secondary information relating to the mobile element 101 may be implemented in the unit, and the rest of the components 102, 103, 105 may be implemented in fixed infrastructures. By way of example road toll systems usually rely on a fixed infrastructure of a telecommunications network.

The trajectory X of the mobile element in which the unit 100 is embedded is composed of a series of positions X[t] estimated at instants t and is associated with a position uncertainty ΔX and a time uncertainty Δt.

The data provided by the secondary information sources 101, 102 are independent of the GNSS receiver 100, but they also depend on the absolute position or on a change of position of said receiver 100. Examples of secondary data sources relating to the mobile element 101 are:
  inertial sensors or odometers providing data about the relative position of the mobile element;
  a mechanical model of the mobile element indicating the ranges of dynamic parameters for the speed, acceleration and/or the gyration of the mobile element.

Additionally, examples of sources of secondary data relating to local conditions 102 are:

a cartographic database providing indications on the roads, for example their types, their widths, their turns as well as indications on the neighbouring environment of said roads;
  an almanac of the satellite constellation or constellations of the GNSS used.

A processing module 103 derives a consistency indicator named coh(X) by combining the positioning information provided by the GNSS receiver 100 with the data provided by the secondary information sources 101, 102.

Detection means 105 then determine a statistical indicator A(X) making it possible to decide if the position X[t] estimated at the instant t is authentic. This indicator corresponds to a digital representation of a confidence in the position.

An example of a statistical indicator A(X) is given by the following expression:

$$A(X)=1 \text{ if } coh(X)>k \text{ and } A(X)=0 \text{ if } coh(X)\leq k$$

The indicator has a value of 1 when the estimated position X[t] is considered sufficiently reliable and 0 if the latter is considered to be falsified. K is a positive or null real value corresponding to a decision threshold.

Another example of an indicator A(X) corresponds to a probability of falsification or a possibility/necessity pair according to Zadeh's fuzzy logic. This then gives A(X)=1−p(X) and the indicator is then based on a probability of falsification p(X). This probability of falsification is given by the following expression:

$$p(X)=f(coh(X))$$

in which f is a function of [0; ∞[toward [0; 1]. By way of example, the function f is given by the following expression:

$$f(coh(X))=(2/\pi)\times\arctan(\alpha\times coh(X)^n)$$

in which the real factors α>0 and n>0 allow the adjustment of the decision; α is defined as the inverse of the value of coh(X) corresponding to a probability of confidence of ½; n is a positive real number, making it possible to regulate the "slope" of the function f.

As explained previously, this confidence indicator A(X) is obtained from a consistency indicator coh(X) or from a combination of consistency indicators. Examples of consistency indicators are described in the rest of the description.

The consistency indicator or indicators correspond(s) to a probability of authenticity of the estimated position. However, the measurement of a consistency indicator at each estimated position X[t] does not provide sufficient proof that fraud has taken place. Like any decision based on measurements, the result of the detection may present false positives, i.e. reported positions may be detected as falsified whereas they are not in reality. The impact of false positives may be significant in the event of a low falsification rate, which is the usual situation. In the same way, false negatives may appear, i.e. a falsified measurement is considered by the system to be a reliable measurement.

To reinforce the reliability of fraud detection, the system according to the invention comprises a consolidation module 104. The consolidation module 104 employs Bayesian statistical inference methods, filtering or any other calculation with the aim of guaranteeing sufficient confidence in the result of the authentication of the estimated positions. To do this, a set of estimated positions X[t] and consistency indicators coh(X) associated with said positions is examined. The aim is to reduce the rate of false positives and false negatives by determining a probability of authenticity or of falsification with a predetermined safety margin.

To do this, the positions X[t] and the indicators coh(X) are stored in a database included in the system, and this is the case for all the units of the system. These data are then grouped into statistical subsets. The position validation comprises one or more tests of hypotheses based on these statistical subset data.

The distribution of the errors in time and the geographical coordinates of the paying and non-paying zones makes it possible to distinguish between a faulty operation of a unit and a deliberate intent to commit fraud. It is then possible to trigger a notification of a fraud incident or a malfunction.

In a preferred embodiment, a vector containing the estimations of positions Xu[t] for a given user u is used at input into a digital filter. By way of example, the consolidation function employed by the digital filter incorporates a set of positions Xu[t] estimated over all or part of the journey, thereby reducing the dispersion of the indicator. In other words, the estimated positions Xu for a given user u are averaged over a predefined time interval.

The frequency of suspicions of falsification for a given user u is stored in a suspicion history 106.

The frequency of suspicion of falsification for chosen geographical zones may also be stored 106 in order to be able to avoid a local effect. In fact, in given geographical zones high rates of false positives and false negatives may appear, for example due to deteriorated radio propagation conditions.

The consolidation module 104 may also perform a correlation between the suspicious estimated positions and a pricing database comprising geographical coordinates of the pricing zones, and thus better characterize an intentional fraud. This makes it possible to take into account the fact that the falsifications usually occur in proximity to or inside the pricing zones. This criterion of coincidence with the pricing zones makes it possible to discern erroneous trajectories aiming to avoid passing through a virtual gate.

In a preferred embodiment, the system comprises a software update mechanism. Thus, the components of the system may be periodically updated, or updated according to the need of the data and the programs used by the system. This may be implemented for any type of device in the system, whether they are distributed in the fixed infrastructure of the network or onboard. The aim of these updates is to improve the efficiency of the system by following the evolution of the falsification methods.

As previously described, the operation of the system requires the determination of consistency indicators. Several examples of consistency indicators coh(X) are described hereinafter.

A first example of a consistency indicator coh(x) is based on the estimation of the consistency of the estimated positions in relation to a dynamic model of movement of a vehicle to be positioned. A dynamic model of movement of the mobile element to be positioned makes it possible to define maximum values or a range of consistent estimations in the space of the measurements of speed, acceleration or gyration in the plane.

For mobile elements corresponding to a motor vehicle, a consistency indicator may be calculated by comparing the speed and the direction of the receiver in relation to this model. To do this, the following ratios may be calculated:
 ratio of the speed v to the maximum possible speed on the trajectory
 ratio of the acceleration a to the maximum possible acceleration on the trajectory
 ratio of the gyration g to the maximum possible gyration on the trajectory
 inclusion of the triplet [v, a, g] in the mechanical domain of the mobile element considered. This domain is limited by a graph in the frame of reference [v, a, g] of which the boundaries are the absolute maxima of speed, acceleration, and gyration.

For mobile elements corresponding to objects, people or animals, the same principles may be applied by defining the authorized domains based on acquired knowledge of the mobility of the object, the possibilities of the animal species or person, while taking into account the possibility of this object, this person or this animal boarding a vehicle. For example, from the fact that it cannot be mounted in a racing car, an object of container type may be associated with a reduced dynamic domain.

In other terms, the implementation of this consistency indicator based on a dynamic movement model equates to associating a dynamic model with the mobile element being followed and comparing the estimated trajectories at the boundaries of this model.

Taking the example of a dynamic model based on road driving, if the user takes a highway when they are claiming to be using a secondary road, the falsification may be detected since their speed will exceed the boundaries of the speed range authorized on secondary roads. By using the same consistency indicator, an erroneous distortion of the trajectory or the presence of hops aiming to avoid pricing events or alarms may be detected.

It should furthermore be noted that unless all the positions are permanently falsified, the trajectory will attach a departure point to an arrival point in a given time corresponding to real positions. Thus, the estimated distance traveled in this time interval will be different from the distance really traveled. Moreover, the road conditions are very different between a secondary road and a highway.

A second example of a consistency indicator coh(X) is based on the use of a cartographic filter. The technique of the cartographic filter is usually denoted by the expression "map-matching". It is used to improve the accuracy of the position estimation of a mobile element based on data from maps. These data make it possible to determine a corrected position Xc[t] from a position X[t] estimated by the GNSS receiver. Known techniques allowing Xc[t] to be obtained from X[t] are, for example, the orthogonal projection of the estimated position X[t] onto the nearest road, or the calculation of a minimum distance between the estimated position X[t] and several possible roads.

A consistency indicator relying on this technique may be used in the framework of the invention. The consistency indicator may be defined as a metric representative of the difference between the estimated position X[t] and the corrected position Xc[t]. The consistency indicator coh(X) corresponds for example to the distance d(X,Xc) which may be the Euclidean, quadratic, geodesic or curvilinear distance between X and Xc.

Figure 2:
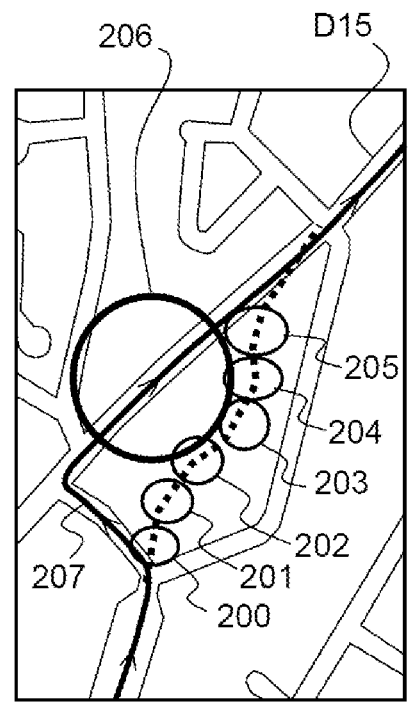
FIG. 2 gives an example of an application of a consistency criterion based on a cartographic filter.

FIG. 2 gives an example of an application of a consistency criterion coh(X) based on a cartographic filter for a road toll system. The positions 200, 201, 202, 203, 204, 206 reported by the onboard unit are falsified with a view to avoiding a virtual gate 206 which will be crossed if the real trajectory 207 is taken into account by the system. In this case, the consistency indicator coh(X) based on a cartographic filter makes it possible to detect that the latter are too far from relevant positions included on a segment of road, this segment of road corresponding for example to the state road D15. For example, coh(X)∈[0.7; 1] if the estimated positions are consistent with the relevant positions and coh(X)∈[0; 0.7] if the estimated positions are inconsistent with the relevant positions.

A third example of a consistency indicator coh(X) is based on the analysis of signals received by the GNSS receiver. This indicator is referred to as a reception consistency indicator in the rest of the description. It has the object of detecting the following events:
 attenuation of satellite signals;
 loss of position;
 difference in visibility of the satellites in relation to the expected visibility.

Figure 3:
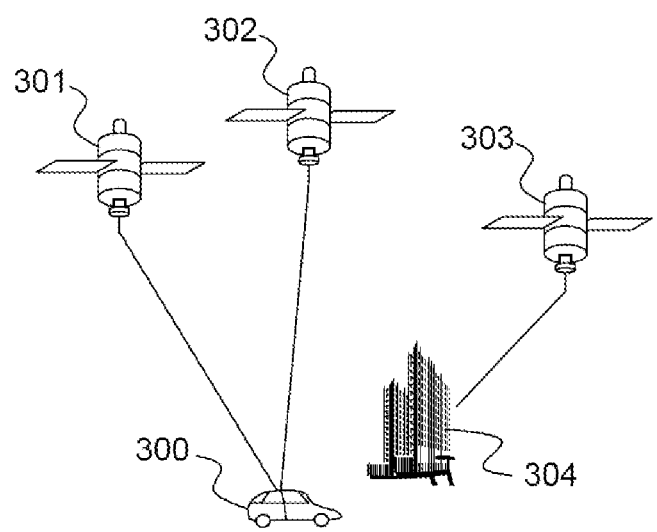
FIG. 3 illustrates the principle of a consistency indicator based on the analysis of signals received by a GNSS receiver.

FIG. 3 illustrates the principle of a consistency indicator coh(X) based on the analysis of signals received by a GNSS receiver. The visibility of the satellites of a GNSS constellation by the unit depends on the physical environment, i.e. on the vegetation, the built structures around the receiver and the topography. In the example in the figure, the unit is on board a vehicle 300. Its GNSS receiver is potentially in direct visibility with 3 satellites 301, 302, 303. However, buildings 304 prevent the unit from receiving the signal originating from one of the three satellites.

The data usually provided at the output of a GNSS receiver comprise, in addition to the estimated position X, the list of the satellites monitored, i.e. the list of the satellites with which the receiver is synchronized. It is therefore possible to verify the consistency between this list of satellites and the visibility of the satellites at the estimated position X at the instant t of estimation. For example, an inconsistency is detected when the receiver indicates that it has locked onto the signal of a satellite, whereas this satellite is masked by an apartment block. When the number of satellites monitored is less than the number of receiver channels and when the receiver should be monitoring other satellites since the latter are visible, an inconsistency is also detected.

This indicator is not very useful when the vehicle is moving on a highway or on an unobstructed road. On the other hand, in the event of a falsified trajectory when the vehicle is crossing an urban zone, all the visible satellites constitute a signature of the real position. This signature is equivalent to a high confidence index.

Various data may be used in order to estimate the probability of the visibility of the satellites on which the receiver bases the position estimation being consistent. Thus, the ends of the segment of road on which the receiver is situated and the width of this segment may be used. Information such as the height $H_b$ of the obstacles preventing the direct visibility of a satellite and the footprint on the ground, i.e. the distance to the road axis, may be used. This type of information may be estimated from one or a plurality of sources including:
 a three-dimensional model of the places crossed by the vehicle;
 photography of the streets;
 aerial or satellite photography enabling recognition of the type of building or vegetation;
 urban planning regulations, notably making it possible to determine the maximum height Hmax of the buildings in a given zone;
 data representative of the population density in order, for example, to deduce an average number of properties and therefore of stories per building;
 a map of the vegetation;
 a seasonal growth model, from which the density and height of foliage of the vegetation of the place in which the vehicle is moving may be deduced, it thus being possible to determine a function of radio attenuation due to the vegetation.

The invention claimed is:

1. A positioning system comprising:
 at least one onboard GNSS satellite receiver in a mobile element belonging to a user u, said receiver having a function of estimating a position Xu of said mobile element at various instants, and
 a first processing module determining a consistency indicator coh(X) by combining the estimated positions Xu[t] and data provided by secondary information sources, a dynamic model of movement of the mobile elements to be positioned being used, said indicator being determined by comparing a speed, acceleration, gyration [v, a, g] triplet derived from direction and velocity measurements taken by the mobile element, to a dynamic model of movement of an object, vehicle, person or animal to be positioned, the system further comprising:
 a consolidation module containing means for storing the positions Xu[t] estimated at various instants t by user u,
 a digital filter configured to obtain a filtered position Xf[t] from the stored positions Xu[t] of the user, the consistency indicator coh(X) being calculated from the filtered positions Xf[t], and
 the system also contains detection means for determining from the consistency indicator coh(X) whether or not the estimated positions Xu(t) are falsified.

2. The positioning system as claimed in claim 1, wherein the digital filter integrates a set of estimated positions Xu[t] over all or part of a journey.

3. The positioning system as claimed in claim 1, wherein the frequency of falsifications for a given user u is calculated and stored in a database.

4. The positioning system as claimed in claim 1, wherein the frequency of falsifications for chosen geographical zones is determined and stored in a database.

5. The positioning system as claimed in claim 1, wherein the estimated positions are used for the implementation of road tolls.

6. The positioning system as claimed in claim 5, wherein the consolidation module performs a correlation between the estimated positions considered as suspicious and a pricing database comprising the geographical coordinates of the pricing zones.

7. A positioning system comprising:
 at least one onboard GNSS satellite receiver in a mobile element belonging to a user u, said receiver having a function of estimating a position Xu of said mobile element at various instants,
 a first processing module determining a consistency indicator coh(X) by combining the estimated positions Xu[t] and data provided by secondary information sources, a dynamic model of movement of the mobile elements to be positioned being used, said indicator being determined by comparing a speed, acceleration, gyration [v, a, g] triplet derived from direction and velocity measurements taken by the mobile element, to a dynamic model of movement of an object, vehicle, person or animal to be positioned,
 a consolidation module configured to store the positions Xu[t] estimated at various instants t by user u,
 a digital filter configured to obtain a filtered position Xf[t] from the stored positions Xu[t] of the user, the consistency indicator coh(X) being calculated from the filtered positions Xf[t], and a detection device configured to determine from the consistency indicator coh(X) whether or not the estimated positions Xu(t) are falsified.

8. The positioning system as claimed in claim 7, wherein the digital filter integrates a set of estimated positions Xu[t] over all or part of a journey.

9. The positioning system as claimed in claim 7, wherein the frequency of falsifications for a given user u is calculated and stored in a database.

10. The positioning system as claimed in claim 7, wherein the frequency of falsifications for chosen geographical zones is determined and stored in a database.

11. The positioning system as claimed in claim 7, wherein the estimated positions are used for the implementation of road tolls.

12. The positioning system as claimed in claim 11, wherein the consolidation module performs a correlation between the estimated positions considered as suspicious and a pricing database comprising the geographical coordinates of the pricing zones.

* * * * *